(No Model.)

A. MEKENNEY.
SEEDING MACHINE.

No. 280,059.  Patented June 26, 1883.

WITNESSES
James A. Tower
Wm A Martin

INVENTOR
Alendo Mekenney
By Attorney
J. L. Newton

UNITED STATES PATENT OFFICE.

ALENDO MEKENNEY, OF MIDDLEBOROUGH, MASSACHUSETTS.

SEEDING-MACHINE.

SPECIFICATION forming part of Letters Patent No. 280,059, dated June 26, 1883.

Application filed January 27, 1883. (No model.)

*To all whom it may concern:*

Be it known that I, ALENDO MEKENNEY, a citizen of the United States, residing at Middleborough, in the county of Plymouth and State of Massachusetts, have invented Improvements in Seeding-Machines, of which the following is a specification.

My invention is an improvement on Letters Patent issued to me of date February 12, 1878, and numbered 200,324. The machine is a hand machine, and the improvements relate to the seed-box, the arrangement of said seed-box and covering-roller and the driving-wheel, and the object of my invention is to provide mechanism by which the seed-box is made in two parts, and a better method of dropping seed therefrom secured, and the scattering of the seed prevented, and mechanism by which the seed-box and covering-roller rotate and cease rotating at the same time, and the mechanism by which the machine is moved on the driving-wheel.

That others may understand the nature and use of my invention, reference is made to the accompanying drawings, which are a part of this specification, in which—

Figure 1:
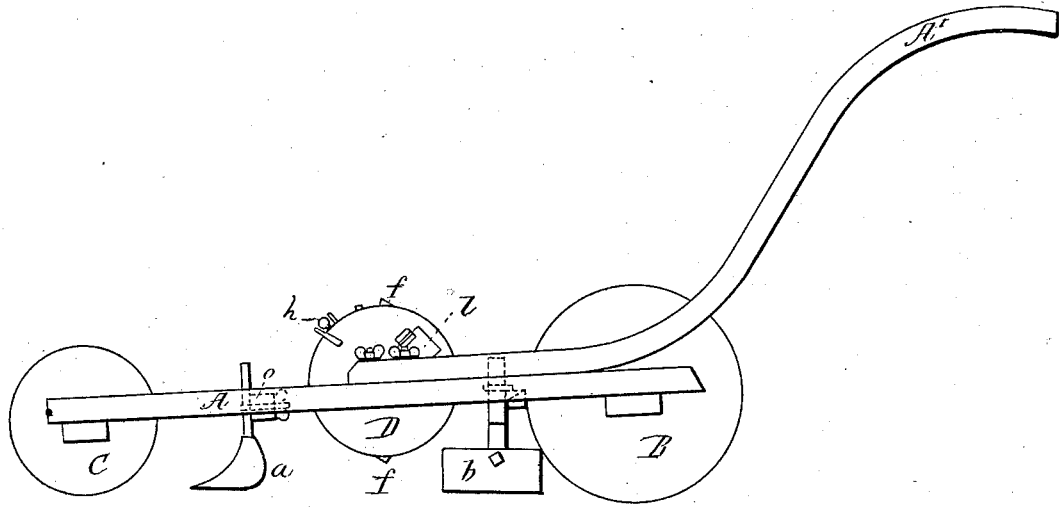
Figure 2:
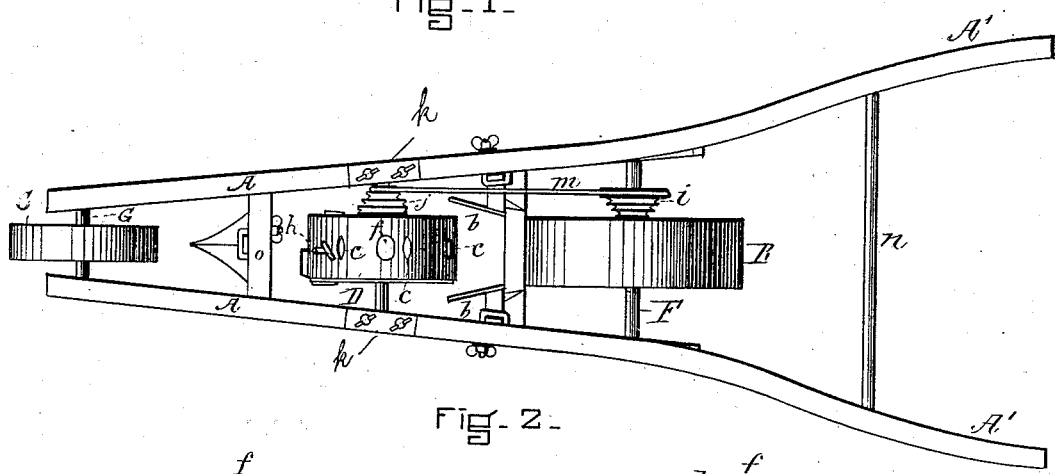
Figure 3:
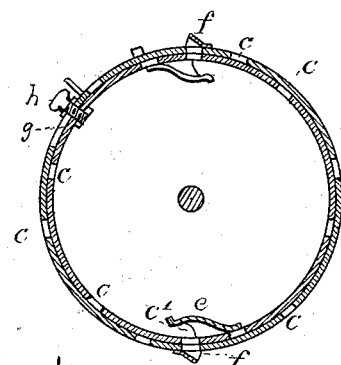
Figure 4:
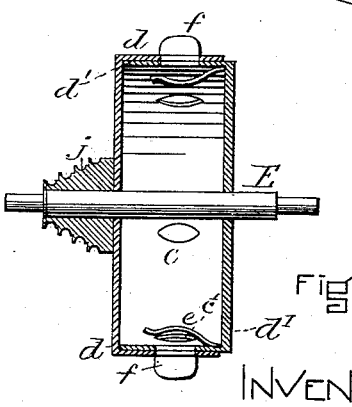

Figure 1 represents a side elevation. Fig. 2 is a plan. Fig. 3 is a vertical section of seed-box with axle removed. Fig. 4 is a vertical cross-section of the box through the axle and the pulley.

The letter A represents the frame, and A' the handles; B, the covering-roller; C, the driving-wheel; D, the seed-box, made in two parts, $d$ and $d'$; E, axle of seed-box, and P axle of covering-roller; G, axle of driving-wheel; $a$, the plow; $b$, spreaders; $c$ and $c'$, openings into the seed-box; $e$, cut-off within the seed-box; $g$, slot in part $d$ for a screw, $h$; $i$, pulley on axle of wheel B; $j$, pulley on seed-box axle; $k$, adjustable piece to let in the axle of the seed-box, and which is secured by thumb-screws; $l$, an opening in the seed-box; $m$, pulley-band; $n$, round in handles; $o$, cross-pieces of the frame A.

Figs. 1 and 2 show the arrangement of the parts of the machine, taking a side view of and looking down upon the machine when in use. A represents the string-pieces of the frame, united by the cross-bars $o$, and A' represents the handles attached to said string-pieces and united by the round $n$. C is the moving wheel rotating upon an axle whose bearings are on the said string-pieces, near the front end of the frame, and when said machine is raised by its handles, so that the roller B is lifted from the ground, it is moved back and forth on its wheel like a wheelbarrow. The plow $a$ is secured to the forward cross-bar, $o$, by a staple and nut, or by any suitable fastening. Following the plow is the seed-box D, provided with suitable openings to drop the seed in hills or drills, and said box is followed by the spreaders $b$, which are secured to the string-pieces by levers, staples, and screws, or by any suitable fastenings. These spreaders cover or spread down smoothly the furrow made by the plow, and into which furrow seed has been dropped, and following the spreading or closing of the furrow is the roller B, which is a broad-rimmed wheel, which smooths and rolls down the soil, covering the seed. The arrangement of all of said parts of the machine is clearly seen in the plan, Fig. 2.

The box D is made in two parts, $d$ and $d'$. $d$ shuts over and turns upon $d'$ like the cover of a cylindrical box, and each part has corresponding adjustable holes, $c$—that is, the openings in each part are of the same size and shape, and the openings $c'$ are opposite in the box, and when openings $c$ are open, openings $c'$ are shut. The openings $c$ may be as numerous as desirable in the box, and are used for continuous sowing or drills. The openings $c'$ are used for hills. In Fig. 3, which is a vertical section of the box, the openings $c$ are represented as closed. In Fig. 4, which is a vertical cross-section of the box, the openings $c$ are open and $c'$ are closed. There is a slot in the part $d$, and a thumb-screw, $h$, which passes through the slot and is secured in $d'$. $d$ turns or is adjustable on $d'$ the length of this slot. (See Figs. 2 and 3.) When the screw $h$ is at one end of the slot, the holes $c$ are fully open. When at the other end, the holes $c$ are closed and $c'$ fully open. When the screw is at equal distance from each end of the slot, all the openings are closed, and thus the openings into the box are graduated by the slot and thumb-screw, and just so much of the openings $c$ and $c'$ are left open as the size of the seed requires. At the openings $c'$ cups or buckets $f$, opposite each other, will be observed. When seed for hills are dropped through these openings, especially small seed, there will be some seed scattering out of the hills. These cups will catch and throw back such stray seed into the box. Within part $d'$, at the openings $c'$, will be observed cut-offs $e$, fastened at one end to the inside of the part $d'$, and the other end of which is left loose, and the cut-off is slightly curved over the hole $c'$. These cut-offs, in the revolution of the box, are to prevent clogging of the seed at the openings, especially necessary in small seed.

$l$ is a door or opening into one end of the box, through which seed is placed in the box.

The advantage of a box in two parts is that it can be taken apart and cleaned, or the part $d'$ can be filled with seed when $d$ and $d'$ are apart, and $d$ covered over $d'$ like a lid, and then it can be readily put in its place, inserting the axle on the side carrying the pulley $j$ into its bearing in string-piece and its bearing at the other end, the piece $k$ being removed and afterward adjusted by screws, as shown in Figs. 1 and 2.

The arrangement of the band $m$ upon the pulleys $i$ and $j$ will be observed. When the wheel C and the covering-roller B are pushed along in the act of sowing the seed, the plow opens the furrow, the seed drops, the box D being rotated by the pulley $j$ and band $m$ connecting said pulley to pulley $i$, by which the covering-roller rotates the box. The arrangement of the driving-wheel C at the forward end of the machine enables the seed-sower to work the machine with great ease in taking the same to the field, and in turning from one furrow to another at the end when using the machine, without scattering the seed, by raising the handles of the machine.

What I claim as my invention, and desire to secure by Letters Patent, is—

1. In combination with the frame of a seeding-machine, the box D, made in two parts, $d$ and $d'$, provided with corresponding openings, $c$ and $c'$, in said parts, the part $d$ also being provided with cups $f$, and the part $d'$ provided with the cut-off $e$, substantially in the manner and for the purpose shown and described.

2. A hand seeding-machine formed of the side pieces, A, the handles A', the cross-pieces $o$, in combination with the driving-wheel C, the seed-box D, and the covering-roller B, each respectively revolving upon the axles G E F, secured to the side pieces, A, said seed-box being revolved by the covering-roller B, when in operation, by means of the pulley-band $m$ and the pulleys $i$ and $j$ on the axles E and F, whereby the covering-roller and the seed-box will cease rotating and scattering seed from the seed-box when the machine is raised upon the driving-wheel by the handles A', as shown and described.

ALENDO MEKENNEY.

Witnesses:
J. L. NEWTON,
I. A. TOWER.